US009505888B2

(12) United States Patent
Yoshida et al.

(10) Patent No.: US 9,505,888 B2
(45) Date of Patent: Nov. 29, 2016

(54) COMPOSITE OF METAL OXIDE NANOPARTICLES AND SILSESQUIOXANE POLYMER, METHOD FOR PRODUCING SAME, AND COMPOSITE MATERIAL PRODUCED USING COMPOSITE THEREOF

(71) Applicant: AZ ELECTRONIC MATERIALS MANUFACTURING (JAPAN) KK, Tokyo (JP)

(72) Inventors: Naofumi Yoshida, Shizuoka (JP); Yuji Tashiro, Shizuoka (JP); Daishi Yokoyama, Shizuoka (JP); Yasuaki Tanaka, Shizuoka (JP); Takashi Fuke, Shizuoka (JP); Megumi Takahashi, Shizuoka (JP); Toshiaki Nonaka, Shizuoka (JP)

(73) Assignee: AZ ELECTRONIC MATERIALS (LUXEMBOURG) S.A.R.L., Luxembourg (LU)

( * ) Notice: Subject to any disclaimer, the term of this patent is extended or adjusted under 35 U.S.C. 154(b) by 0 days.

(21) Appl. No.: 14/652,666

(22) PCT Filed: Dec. 19, 2013

(86) PCT No.: PCT/JP2013/084017

§ 371 (c)(1),
(2) Date: Jun. 16, 2015

(87) PCT Pub. No.: WO2014/098167

PCT Pub. Date: Jun. 26, 2014

(65) Prior Publication Data

US 2015/0329679 A1 Nov. 19, 2015

(30) Foreign Application Priority Data

Dec. 21, 2012 (JP) ................................ 2012-280116

(51) Int. Cl.

| | |
|---|---|
| ***C08G 77/398*** | (2006.01) |
| ***C08G 77/08*** | (2006.01) |
| ***C08G 77/06*** | (2006.01) |
| ***B82Y 30/00*** | (2011.01) |
| ***C08G 77/58*** | (2006.01) |
| ***C08G 79/00*** | (2006.01) |
| ***C08K 3/22*** | (2006.01) |
| ***C08L 83/06*** | (2006.01) |
| *C09D 183/04* | (2006.01) |

(52) U.S. Cl.

CPC ............ *C08G 77/398* (2013.01); *B82Y 30/00* (2013.01); *C08G 77/06* (2013.01); *C08G 77/08* (2013.01); *C08G 77/58* (2013.01); *C08G 79/00* (2013.01); *C08K 3/22* (2013.01); *C08L 83/06* (2013.01); *C08K 2201/005* (2013.01); *C08K 2201/011* (2013.01); *C09D 183/04* (2013.01)

(58) Field of Classification Search

None

See application file for complete search history.

(56) References Cited

U.S. PATENT DOCUMENTS

| | | | | |
|---|---|---|---|---|
| 2004/0179800 A1* | 9/2004 | Walker, Jr. | C03C 25/101 | 385/128 |
| 2005/0069718 A1 | 3/2005 | Yoss-Kehl et al. | | |
| 2010/0160577 A1 | 6/2010 | Hirano | | |
| 2011/0223404 A1* | 9/2011 | Wu | G03G 5/08 | 428/220 |
| 2013/0040135 A1* | 2/2013 | Hirano | C08K 3/34 | 428/353 |
| 2013/0253161 A1* | 9/2013 | Amako | B82Y 30/00 | 528/32 |
| 2015/0147362 A1* | 5/2015 | Drovetskaya | A61K 8/27 | 424/401 |

FOREIGN PATENT DOCUMENTS

| | | | |
|---|---|---|---|
| JP | 2007-507583 A | | 3/2007 |
| JP | 2010-150341 A | | 7/2010 |
| JP | 2011-042759 | * | 3/2011 |
| JP | 2011-42759 A | | 3/2011 |
| WO | WO 2012/078645 | * | 6/2012 |

OTHER PUBLICATIONS

Abstract of JP 2011/042759 (Mar. 2011).*

* cited by examiner

*Primary Examiner* — Marc Zimmer

(74) *Attorney, Agent, or Firm* — Mitchell Brustein

(57) ABSTRACT

[Problem] An object of the present invention is to provide a composite of metal oxide nanoparticles and a silsesquioxane polymer, which can form a high-quality cured film wherein aggregation and the like of metal oxide do not occur during a curing process and the metal oxide is uniformly dispersed. [Means for Solution] Provided are: a method of producing a composite of metal oxide nanoparticles and a silsesquioxane polymer, the method comprising reacting a silsesquioxane polymer having a silanol group at a terminal, or a silane monomer with metal oxide nanoparticles having a hydroxyl group or an alkoxy group on the surface in an aqueous solvent in the presence of a phase transfer catalyst; and a composite produced by the method.

9 Claims, No Drawings

COMPOSITE OF METAL OXIDE NANOPARTICLES AND SILSESQUIOXANE POLYMER, METHOD FOR PRODUCING SAME, AND COMPOSITE MATERIAL PRODUCED USING COMPOSITE THEREOF

This application is a United States National Stage Patent Application under 35 U.S.C. §371 of International Patent Application No. PCT/JP2013/084017, filed Dec. 19, 2013, which claims priority to Japanese Patent Application No. 2012-280116, filed Dec. 12, 2012, the contents of which are being hereby incorporated herein by reference.

BACKGROUND OF THE INVENTION

Technical Field

The present invention relates to: a composite (hybrid) of metal oxide nanoparticles and a silsesquioxane polymer, which is used in the production of a metal oxide-containing composite cured film used in electron devices, such as a high-refractive index film or a high-dielectric film; and a method of producing the same.

Background Art

Conventionally, as cured films such as high-refractive index films and high-dielectric films that are used in electron devices, silicon films made of silicon oxide, silicon nitride or the like have been used. As a method of forming such a silicon film, a chemical vapor deposition method such as PE-CVD or a method of coating and then heat-curing a composition comprising a silicon-containing resin is employed. For the purpose of improving the physical properties or refractive index of such a cured film, studies have been conducted on dispersion of metal oxides in silicon-containing resins.

Such metal oxide-containing resins are generally produced by dispersing a metal oxide in a resin. A metal oxide can be synthesized by a variety of methods. However, it is commonly synthesized by a sol-gel method using a metal alkoxy compound as a starting material. As a solvent used in this synthesis, water or a water-alcohol mixed solvent is commonly used. Therefore, the resulting metal oxide sol has a hydrophilic hydroxy group on the surface and is often supplied in the form of an aqueous dispersion.

Accordingly, in the above-described method, a hydrophilic metal oxide is dispersed in a hydrophobic resin. However, it is difficult to uniformly disperse such a metal oxide as-is into a resin. In order to solve this problem, it has also been examined to disperse a hydrophilic group-containing metal oxide by adding a hydrophobic monomer or a resin to the surface of the metal oxide.

SUMMARY OF THE INVENTION

Problems to be Solved by the Invention

However, in these prior arts, from the cost standpoint, it is disadvantageous to perform surface modification of a metal oxide for improvement of its dispersibility. In addition, since a metal oxide obtained by such a method is simply dispersed in a resin, there are also problems to be resolved that, for example, aggregation and the like of the metal oxide are likely to occur during a curing process and a prescribed physical property thus may not be attained.

Means for Solving the Problems

The first composite of metal oxide nanoparticles and a silsesquioxane polymer according to the present invention is characterized in that it is obtained by reacting a silsesquioxane polymer having a silanol group at a terminal, or a silane monomer(s), with metal oxide nanoparticles having a hydroxyl group or an alkoxy group on the surface in a mixed solvent of an aqueous solvent and an organic solvent in the presence of a phase transfer catalyst.

The second composite according to the present invention comprises a silsesquioxane polymer and metal oxide nanoparticles and is characterized in that silicon atoms of the silsesquioxane polymer are bound with the surface of the metal oxide nanoparticles via oxygen atoms.

The electron device according to the present invention is characterized by comprising the above-described metal oxide-containing composite material as an interlayer film, a refractive index control film or a protective film.

Further, the method of producing a composite of metal oxide nanoparticles and a silsesquioxane polymer according to the present invention is characterized by comprising reacting a silsesquioxane polymer having a silanol group at a terminal with metal oxide nanoparticles having a hydroxyl group or an alkoxy group on the surface in a mixed solvent of an aqueous solvent and an organic solvent in the presence of a phase transfer catalyst.

Effects of the Invention

The composite of metal oxide nanoparticles and a silsesquioxane polymer according to the present invention is useful for forming a cured film used in an electron device and, since aggregation and the like of the metal oxide do not occur during a curing process, the composite can form a high-quality cured film in which the metal oxide is uniformly dispersed. Such a cured film can be used as, for example, a high-dielectric film of a liquid crystal display, an insulation film of organic light-emitting diode, an interlayer film, a refractive index control film or a protective film. Further, a cured film produced from the composite of the present invention is also characterized in that defects such as cracking are not likely to occur even when the film thickness is increased.

Furthermore, the composite of metal oxide nanoparticles and a silsesquioxane polymer according to the present invention can be produced in a simple and inexpensive manner because the production process does not require a step of modifying the metal oxide surface.

DETAILED DESCRIPTION OF THE INVENTION

Mode for Carrying Out the Invention

Mode for carrying out the present invention will now be described in detail.

According to one embodiment of the present invention, a composite of metal oxide nanoparticles and a silsesquioxane polymer (hereinafter, may be simply referred to as "composite") is produced by a specific production method. Concretely, this production method comprises reacting a silsesquioxane polymer having a silanol group at a terminal with metal oxide nanoparticles having a hydroxyl group or an alkoxy group on the surface in a mixed solvent of an aqueous solvent and an organic solvent in the presence of a phase transfer catalyst. This method may be hereinafter referred to as "reverse micelle dispersion method".

One characteristic feature of a silsesquioxane polymer that can be used in the present invention is that it has a silanol group at a terminal. The silsesquioxane polymer is a polymer containing a repeating unit typically represented by $[R^1SiO_{1.5}]$, and each silicon atom is bound with, on average, 1.5 oxygen atoms and one hydrocarbon group $R^1$. The oxygen atom at a polymer terminal is bound with hydrogen to form a silanol group, or with a hydrocarbon group. Further, the silsesquioxane polymer may also contain $[SiO_2]$ as a repeating unit. In the present invention, the term "silsesquioxane polymer" also encompasses polymers having a unit $[SiO_2]$ (siloxane bond) or the like. Here, the silicon atoms are all tetravalent, and 3 or 4 oxygen atoms are bound to each silicon atom. Each oxygen atom is bound with other silicon atom, hydrogen atom or hydrocarbon group via another bonding arm. Accordingly, since each oxygen atom is assigned to two atoms to which the oxygen atom is bound, even though 3 or 4 oxygen atoms are bound to the four bonding arms of each silicon atom, the number of oxygen atoms assigned to one repeating unit containing one silicon atom is a half thereof, which is 1.5 or 2.

That is, a silsesquioxane polymer preferably used in the present invention comprises a repeating unit selected from the group consisting of $[R^1SiO_{1.5}]$ (wherein $R^1$ is a group selected from the group consisting of hydrogen, an alkyl group, an aryl group and an alkenyl group) and $[SiO_2]$. Here, the silsesquioxane polymer may contain a combination of two or more repeating units $[R^1SiO_{1.5}]$ in which $R^1$ is different. Further, within a range where the effects of the present invention are not adversely affected, the silsesquioxane polymer may also contain other repeating unit, particularly a silicon-containing repeating unit.

The main-chain portion of the silsesquioxane polymer is constituted by the above-described repeating unit(s), and the composition ratio of the repeating unit $[R^1SiO_{1.5}]$ and the repeating unit $[SiO_2]$ is preferably 100:0 to 40:60, more preferably 90:10 to 60:40.

Such a silsesquioxane polymer can be produced by an arbitrary method. For example, it can be produced by using a trifunctional organosilicon monomer and a tetrafunctional silicon monomer as starting materials and subjecting these monomers to a co-hydrolysis reaction.

More specifically, a silsesquioxane polymer having a silanol group at a terminal can be obtained by using $R^1Si(OR^2)_3$ and $Si(OR^2)_4$ as starting monomers and subjecting them to a co-hydrolysis reaction in the presence of an alkaline catalyst. Here, $R^1$ is a group selected from the group consisting of hydrogen, an alkyl group, an aryl group and an alkenyl group, and $R^2$ represents hydrogen or an alkyl group. In cases where a group other than hydrogen is selected, the group preferably has 1 to 10 carbon atoms. Two or more monomers in which $R^1$ and $R^2$ are different can also be used in combination. In this case, by adjusting the blending ratio of $R^1Si(OR^2)_3$ and $Si(OR^2)_4$, the composition ratio of the repeating units $[R^1SiO_{1.5}]$ and $[SiO_2]$ that are contained in the resulting silsesquioxane polymer can be adjusted.

As the repeating unit $[R^1SiO_{1.5}]$, those in which $R^1$ is different, for example, $R^1$ is a phenyl group, a methyl group or an ethyl group, can be used in combination. Further, the silsesquioxane polymer may also contain a repeating unit other than $[R^1SiO_{1.5}]$ and $[SiO_2]$. Particularly, a silsesquioxane polymer comprising a phenylene structure-containing repeating unit is preferably used because the crack resistance of a cured film formed therefrom is improved. Specifically, a silsesquioxane polymer having a main-chain portion represented by the following Formula (1) can be used.

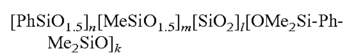

$$[PhSiO_{1.5}]_n[MeSiO_{1.5}]_m[SiO_2]_l[OMe_2Si\text{-}Ph\text{-}Me_2SiO]_k \quad (1)$$

wherein, Ph represents a phenyl group; Me represents a methyl group; n, m, l and k are each a number indicating the composition ratio of each repeating unit; generally, n+m is 40 to 100% by mol,
l is 0 to 40% by mol, and
k is 0 to 40% by mol;
and preferably,
n+m is 70 to 90% by mol,
l is 5 to 15% by mol, and
k is 0 to 20% by mol.

It is preferred that n be 40 to 60% by mol and m be 30 to 50% by mol.

As a reaction solvent, an ether, an ester or a ketone is generally used and, specifically, propylene glycol monomethyl ether acetate (hereinafter, may be referred to as "PGMEA"), propylene glycol monomethyl ether (hereinafter, may be referred to as "PGME") or propyl acetate is preferably used.

As a basic catalyst, for example, sodium hydroxide, potassium hydroxide, or a nitrogen-containing aromatic compound such as ammonia, a quaternary ammonium salt or pyridine is used. Further, as a solvent of these catalysts, pure water can be used. In this case, pure water can also function as a catalyst for promoting the reaction.

The reaction temperature is not particularly restricted. However, in order to allow the reaction to proceed in a moderate condition, it is preferred that the reaction be performed at about room temperature. If it is necessary to control the temperature, the temperature is controlled generally at 0 to 50° C., preferably at 20 to 30° C.

By such a reaction, a silsesquioxane polymer having a hydroxyl group at a terminal is obtained. The molecular weight of the resulting silsesquioxane polymer varies depending on the types of the starting materials as well as the reaction conditions. However, the silsesquioxane used in the present invention has a weight-average molecular weight of generally 500 to 20,000, preferably 700 to 5,000, and a number-average molecular weight of generally 300 to 5,000, preferably 500 to 2,000, in terms of polystyrene. A higher molecular weight is more advantageous from the standpoints of the residual film ratio and the like, while a lower molecular weight is more advantageous from the standpoints of the reactivity with metal oxide particles and the stability of the polymer.

As required, the thus produced silsesquioxane can be purified by washing, recrystallization or the like.

In the present invention, a variety of metal oxide nanoparticles can be used in accordance with the purpose thereof, and the type of the metal is not particularly restricted. Generally speaking, "metal" is a general term for the elements of Groups I to XII; aluminum, gallium, indium and thallium of Group XIII; tin and lead of Group XIIII; and bismuth of Group XV; however, in the present invention, the term "metal" also includes boron. Many of the transition metals are generally useful.

Depending on the type of the metal used, different properties can be imparted to the resulting cured film. For example, when nanoparticles of titanium oxide or zirconium oxide are used, the resulting cured film tends to have a high refractive index. When europium oxide is used, fluorescence properties can be imparted to the cured film. Further, when zinc oxide is used, UV-absorbing property is imparted. When boron oxide is used, the resulting film has a low dielectric constant and, when aluminum oxide is used, infrared-absorbing property is imparted. From the standpoint of improving or imparting these properties, it is preferred to use an oxide of titanium, zirconium, zinc, boron or aluminum.

In the present invention, as the above-described metal oxide, one having a hydroxyl group or an alkoxy group on the particle surface is used. Such metal oxide nanoparticles can be represented by the following Formula:

$$M_xO_y(OR)_z \quad (2)$$

(wherein

M is an element selected from the group consisting of Ti, Zr, Eu, Zn, B, Al, Ta and Hf;

R is hydrogen or a $C_1$ to $C_{10}$, preferably $C_1$ to $C_6$ alkyl group or alkenyl group; and 2y+z=x×[valence of M]).

Here, two or more metal element Ms and substituent Rs may exist in combination.

The particle size of the metal oxide nanoparticles is arbitrarily selected in accordance of the purpose thereof. For example, in an application where optical transparency is demanded, a particle size that does not impair the transparency is selected according to the wavelength of light. Further, in an application such as an insulation film, it is preferred to select metal oxide nanoparticles having a relatively large particle size. Still, the average particle size of the metal oxide nanoparticles used in the present invention is preferably 5 to 200 nm, more preferably 20 to 100 nm. The average particle size of the metal oxide nanoparticles can be determined by dynamic light scattering measurement.

Such an oxide can be produced by a common sol-gel method. Meanwhile, an oxide produced by curing contains hardly any hydroxyl group or the like. Therefore, it is preferred to use metal oxide nanoparticles produced by a sol-gel method. Specifically, by adjusting a sol using $M(OR)_4$ as a starting material, the metal oxide nanoparticles represented by the Formula (2) can be prepared.

The silsesquioxane polymer according to the present invention is produced by partial chemical bonding between the above-described silsesquioxane polymer having a silanol group at a terminal and the above-described metal oxide nanoparticles. One characteristic feature of the present invention is the use of a phase transfer catalyst as a catalyst of this reaction.

That is, silsesquioxane is usually used in a state of being dissolved in an organic solvent. Meanwhile, when metal oxide nanoparticles are added to a silsesquioxane polymer solution, generally, the nanoparticles are not added in a powder form, but in the form of a dispersion in which the particles are dispersed in an aqueous medium. The reason for this is because metal oxide is hydrophilic as described above and it is thus difficult to disperse metal oxide in an organic solvent, and solid-form particles such as powder are not uniformly dispersed.

Accordingly, reaction between a silsesquioxane-containing organic phase and a metal oxide-containing aqueous phase is not likely to proceed sufficiently. Therefore, in the present invention, a phase transfer catalyst is used to facilitate the reaction between these phases. In the present invention, such a method is referred to as "reverse micelle dispersion method".

The reverse micelle dispersion method will now be described more concretely.

First, a polymer solution is prepared by dissolving a silsesquioxane polymer having a silanol group at a terminal in an organic solvent. Here, as the organic solvent, PGMEA, n-propyl acetate (hereinafter, may be referred to as "nPA") and the like can be used. Thereamong, nPA is preferably used from the standpoint of its separability from an aqueous solvent. Alternatively, instead of a polymer solution, silane monomers corresponding to the starting materials of the silsesquioxane polymer can be used as well. As the silane monomers, $R^1Si(OR^2)_3$ and $Si(OR^2)_4$ (wherein $R^1$ and $R^2$ are each a group selected from the group consisting of hydrogen, an alkyl group, an aryl group and an alkenyl group) can be used.

On another front, a dispersion of metal oxide nanoparticles is prepared. Such a dispersion can be prepared by producing a metal oxide by a sol-gel method and dispersing the metal oxide. However, a commercially available suspension can also be used as is. For example, an aqueous dispersion of aluminum oxide, titanium oxide, zirconium oxide, zinc oxide or the like (average particle size: about 30 nm), which is commercially available from CIK NanoTek Corporation under the trademark NanoTek, can be used.

Next, a prescribed amount of a phase transfer catalyst is added to the aqueous dispersion of metal oxide nanoparticles, and the silsesquioxane polymer solution is subsequently introduced thereto to perform reaction. That is, the reaction is performed in a mixed solvent of an aqueous solvent and an organic solvent.

As the phase transfer catalyst, quaternary ammonium compounds, quaternary phosphonium compounds, pyridinium compounds and crown ethers can be used, and it is preferred to use a quaternary ammonium compound or a quaternary phosphonium compound. A quaternary ammonium compound or a quaternary phosphonium compound interacts with the hydroxyl group existing on the surface of the metal oxide nanoparticles and improves the affinity of the metal oxide nanoparticles to an organic solvent, thereby functioning to facilitate phase transfer to an organic phase. Pyridinium compounds also have the same function. Further, crown ethers exhibit the same function by partially clathrating the polymer molecule. Among these compounds, specifically, a tetrabutylammonium salt, a trioctylmethylammonium salt or a benzyldimethyloctadecylammonium salt is preferably used. The phase transfer catalyst is used in an amount of preferably 10 to 100% by mol, more preferably 20 to 50% by mol, with respect to the number of moles of the metal oxide nanoparticles.

The blending ratio of the silsesquioxane polymer or silane monomers and the metal oxide nanoparticles is adjusted in accordance with the purpose, and it is generally 95:5 to 5:95, preferably 30:70 to 80:20, based on the weight.

The reaction temperature is preferably 0 to 120° C., more preferably 20 to 80° C. The reaction time is not particularly restricted, and the reaction sufficiently proceeds as long as the reaction time is not shorter than 1 hour.

In a composite obtained in this manner, the silanol group existing in the polymer matrix and the metal oxide nanoparticles are chemically-bonded. This chemical bond is formed by a condensation reaction between the silanol group contained in the silsesquioxane polymer and the hydroxyl group or alkoxy group on the surface of the metal oxide nanoparticles. That is, the composite has a structure wherein the silicon atoms of the silsesquioxane polymer and the surface of the metal oxide nanoparticles are bound via oxygen atoms.

Since the composite according to the present invention has such a structure, the metal oxide nanoparticles neither precipitate nor aggregate. Therefore, in a cured product obtained by using this composite, metal oxide is uniformly dispersed, and this allows excellent properties to be exhibited.

The composite according to the present invention obtained in this manner is coated on a substrate or the like and subsequently heated to form a cured film. For the formation of such a cured film, a conventionally known arbitrary method can be employed.

Specifically, a cured film is formed by coating a composition containing the above-described composite on the surface of a base material, such as a silicon substrate, a glass substrate, a resin film, a wired substrate or a light-extraction part of a display device such as FPD, so as to form a coating film and subsequently curing the thus formed coating film.

The composition containing the composite is prepared by dissolving the composite in a solvent. This solvent is selected from those which are capable of dissolving the composite.

Examples of such a solvent include ethylene glycol monoalkyl ethers such as ethylene glycol monomethyl ether, ethylene glycol monoethyl ether, ethylene glycol monopropyl ether and ethylene glycol monobutyl ether; diethylene glycol dialkyl ethers such as diethylene glycol dimethyl ether, diethylene glycol diethyl ether, diethylene glycol dipropyl ether and diethylene glycol dibutyl ether; ethylene glycol alkyl ether acetates such as methyl cellosolve acetate and ethyl cellosolve acetate; propylene glycol alkyl ether acetates such as PGMEA, propylene glycol monoethyl ether acetate and propylene glycol monopropyl ether acetate; aromatic hydrocarbons such as benzene, toluene and xylene; and ketones such as methyl ethyl ketone, acetone, methyl amyl ketone, methyl isobutyl ketone and cyclohexanone. These solvents may each be used individually, or two or more thereof may be used in combination. The blending ratio of the solvent(s) is usually not less than 50% by weight, preferably not less than 60% by weight, and usually 90% by weight or less, preferably 85% by weight or less, based on the total weight of the composition containing the composite.

Further, as required, the composition according to the present invention may also contain other component(s). Examples thereof include surfactants, lubricants and viscosity modifiers.

Thereamong, it is preferred to use a surfactant so as to improve the coating property. Examples of a surfactant that can be used in the composition of the present invention include non-ionic surfactants, anionic surfactants and amphoteric surfactants.

Examples of the non-ionic surfactants include polyoxyethylene alkyl ethers such as polyoxyethylene lauryl ether, polyoxyethylene oleyl ether and polyoxyethylene cetyl ether; polyoxyethylene fatty acid diesters; polyoxy fatty acid monoesters; polyoxyethylene-polyoxypropylene block polymers; acetylene alcohols; acetylene glycols; polyethoxylates of acetylene alcohols; acetylene glycol derivatives such as polyethoxylates of acetylene glycols; fluorine-containing surfactants, such as Fluorad (trade name, manufactured by Sumitomo 3M Ltd.), MEGAFACE (trade name, manufactured by DIC Corporation) and Surufuron (trade name, manufactured by Asahi Glass Co., Ltd.); and organosiloxane surfactants such as KP341 (trade name, manufactured by Shin-Etsu Chemical Co., Ltd.). Examples of the above-described acetylene glycols include 3-methyl-1-butyne-3-ol, 3-methyl-1-pentyne-3-ol, 3,6-dimethyl-4-octyne-3,6-diol, 2,4,7,9-tetra methyl-5-decyne-4,7-diol, 3,5-dimethyl-1-hexyne-3-ol, 2,5-dimethyl-3-hexyne-2,5-diol and 2,5-dimethyl-2,5-hexanediol.

Examples of the anionic surfactants include ammonium salts and organic amine salts of alkyldiphenyl ether disulfonic acids; ammonium salts and organic amine salts of alkyldiphenyl ether sulfonic acids; ammonium salts and organic amine salts of alkylbenzenesulfonic acids; ammonium salts and organic amine salts of polyoxyethylene alkyl ether sulfuric acids; and ammonium salts and organic amine salts of alkyl sulfuric acids.

Examples of the amphoteric surfactants include 2-alkyl-N-carboxymethyl-N-hydroxyethyl imidazolium betaine and lauric acid amide propylhydroxysulfone betaine.

These surfactants may be used individually, or two or more thereof may be used in combination, and the blending ratio thereof is usually 50 to 5,000 ppm, preferably 100 to 2,000 ppm, with respect to the total weight of the composition.

A coating film of the composition of the present invention can be formed by a common coating method, that is, an arbitrary method conventionally known as a coating method of a photosensitive composition, such as dip coating, roll coating, bar coating, brush coating, spray coating, doctor coating, flow coating, spin coating or slit coating. When the base material is a film, a coating film can also be formed by gravure coating. If desired, a drying step in which the solvent is removed from the coating film can also be incorporated separately. As required, the composition can be coated once, twice or more times to form a coating film of a desired thickness.

After the formation of a coating film, in order to dry the coating film and reduce the amount of residual solvent, it is preferred that the coating film be subjected to prebaking (heat treatment). The prebaking step is performed at a temperature of generally 70 to 150° C., preferably 90 to 150° C., for a period of 10 to 180 seconds, preferably 30 to 90 seconds when a hot plate is used, or 1 to 30 minutes when a clean oven is used.

The curing temperature for curing the coating film can be arbitrarily selected as long as it is a temperature at which the coating film is cured. However, when the curing temperature is excessively low, the reaction may not proceed sufficiently and the coating film may thus not be cured sufficiently. Therefore, the curing temperature is preferably 150° C. or higher, more preferably 250° C. or higher. Meanwhile, when the curing temperature is excessively high, for example, the production cost is increased and the polymer may be decomposed; therefore, the curing temperature is preferably 500° C. or lower, more preferably 400° C. or lower. The curing time is not particularly restricted. However, it is generally 5 minutes or longer, preferably 10 minutes or longer.

Further, the curing is performed in an inert gas or in the air.

A cured film produced by the above-described method, which is a metal oxide-containing composite material, has excellent physical properties. Specifically, the cured film of the present invention has excellent refractive index, transmittance, strength, dielectric constant and the like depending on the type of the incorporated metal oxide, and these properties are uniform throughout the cured film. Therefore, the cured film of the present invention is capable of exhibiting properties that are not found in conventional silicon materials and can thus be used as an interlayer film, a refractive index control film, a protective film or the like in, for example, optical applications such as electron devices, optical devices, LEDs and OLEDs.

EXAMPLES

The present invention will now be described concretely by way of examples thereof.

Synthesis Example 1

Synthesis of Silsesquioxane Polymer A

To a four-necked flask, 174 g of methyltriethoxysilane ($MeSi(OC_2H_5)_3$) and 360 g of PGMEA were loaded, and these materials were dissolved. Next, 8.33 g of 48% aqueous sodium hydroxide solution was added thereto, and the resultant was stirred at 500 rpm for 2 hours. Then, 12 g of acetic acid and 120 g of pure water were further added, and the resultant was stirred for 1 hour.

Thereafter, the resulting reaction solution was transferred to a separatory funnel and left to stand for 30 minutes, thereby separating an organic solvent phase and an aqueous phase.

The aqueous phase was discarded, and 120 g of pure water was newly added to the organic solvent phase in the separatory funnel, followed by shaking. The alkaline component and water-soluble component remaining in the organic solvent phase were extracted and washed. This washing operation was performed three times. Thereafter, the organic solvent phase washed with pure water was recovered.

As a result of measuring the molecular weight of silsesquioxane polymer A contained in the organic solvent phase, the number-average molecular weight and the weight-average molecular weight were found to be 3,000 and 7,500, respectively, in terms of polystyrene. This polymer was adjusted with a PGMEA solution to a concentration of 20 wt % to obtain a silsesquioxane polymer A solution.

Synthesis Example 2

Synthesis of Silsesquioxane Polymer B

To a four-necked flask, 156 g of methyltriethoxysilane and 24 g of phenyltriethoxysilane were loaded, and these materials were dissolved. Then, 8.33 g of 48% aqueous sodium hydroxide solution was added thereto, and the resultant was stirred for 2 hours.

Thereafter, synthesis and purification were performed in the same manner as in Synthesis Example 1, thereby obtaining a silsesquioxane polymer B having a number-average molecular weight of 1,500 and a weight-average molecular weight of 2,800, in terms of polystyrene. Thus obtained polymer was adjusted with a PGMEA solution to a concentration of 20 wt % to prepare a silsesquioxane polymer B solution.

Synthesis Example 3

Synthesis of Silsesquioxane Polymer C

A silsesquioxane polymer C was obtained by performing synthesis and purification in the same manner as in Synthesis Example 1, except that 240 g of phenyltriethoxysilane was used in place of methyltriethoxysilane.

Thus obtained polymer had a number-average molecular weight of 1,000 and a weight-average molecular weight of 1,700, in terms of polystyrene. This polymer was adjusted with a PGMEA solution to a concentration of 20 wt % to prepare a silsesquioxane polymer C solution.

Synthesis Example 4

Synthesis of Silsesquioxane Polymer D

A silsesquioxane polymer D was obtained by performing synthesis and purification in the same manner as in Synthesis Example 1, except that 89 g of methyltriethoxysilane, 96 g of phenyltriethoxysilane and 21 g of tetraethoxysilane were used in a four-necked flask.

Thus obtained polymer had a number-average molecular weight of 1,000 and a weight-average molecular weight of 1,400, in terms of polystyrene. This polymer was adjusted with a PGMEA solution to a concentration of 20 wt % to prepare a silsesquioxane polymer D solution.

Example 1

Formation of Composite with Zirconia Nanoparticle

To a three-necked flask, 50 g of zirconia nanoparticles manufactured by CIK NanoTek Corporation (dispersed in water, concentration: 15 wt %, average particle size: 50 nm) and 50 g of PGMEA were loaded. Then, 2.1 g (0.09 mol) of trioctylmethylammonium chloride, a phase transfer catalyst, was added thereto. To this reaction mixture, 25 g of the silsesquioxane polymer C was added and allowed to react for 1 hour.

Thereafter, the reaction mixture was transferred to a separatory funnel and left to stand for 30 minutes. The liquid was separated into two phases in a transparent state. Since the organic phase was transparent, it was judged that aggregation or the like of the $ZrO_2$ nanoparticles did not occur.

After removing the aqueous phase, 50 g of water was further added to wash the organic solvent phase. The organic solvent phase was recovered and then concentrated using an evaporator to adjust the concentration to be about 20 wt %, thereby obtaining a composite solution.

Example 2

Formation of Composite with Zirconia Nanoparticle

Experiment was conducted in the same manner as in Example 1, except that the silsesquioxane polymer A was used as the polymer.

Example 3

Formation of Composite with Titania Nanoparticle

To a three-necked flask, 50 g of tetraisopropoxy titanate and 400 g of IPA were loaded. Then, 60 g of pure water was added thereto, and the resultant was stirred for about 30 minutes to prepare a sol. After adding thereto 20 wt % aqueous tetrabutylammonium hydroxide solution and stirring the resultant for 30 minutes, 200 g of PGME was further added. The resulting mixture was refluxed at 120° C. to prepare titanium oxide particles (particle size: 100 nm). To this solution, 116 g of the silsesquioxane polymer D was added as a polymer and allowed to react for 2 hours. Thereafter, the solution was transferred to a separatory funnel and, after adding thereto 400 g of water and 500 g of normal propyl acetate, the resultant was left to stand. The liquid was separated into two layers in a transparent state. After removing the aqueous layer, the organic layer was recovered and concentrated using an evaporator to adjust the concentration to be about 20 wt %.

Example 4

Formation of Composite with Titania Nanoparticle

Hybridization was performed in the same manner as in Example 3, except that the silsesquioxane D was used in an amount of 41.2 g.

Example 5

Formation of Composite with Titania Nanoparticle

Hybridization was performed in the same manner as in Example 3, except that the silsesquioxane D was used in an amount of 32.8 g.

Example 6

Formation of Composite with Titania Nanoparticle

To a four-necked flask, 27 g of phenyltriethoxysilane ($PhSi(OC_2H_5)_3$) and 30 g of PGME were loaded, and these materials were dissolved. Subsequently, 30 g of pure water and 0.3 g of trioctylmethylammonium dissolved in 30 g of PGME were added, and the resultant was stirred for 30 minutes at 500 rpm and 100° C. The titanium oxide particles (particle size: 100 nm) prepared in Example 3 were further added thereto and allowed to react at 120° C. for 2 hours. Thereafter, the resulting solution was transferred to a separatory funnel and, after adding thereto 400 g of water and 500 g of normal propyl acetate, the resultant was left to stand. The liquid was separated into two layers in a transparent state. After removing the aqueous layer, the organic layer was recovered and concentrated using an evaporator to adjust the concentration to be about 20 wt %.

Thus prepared hybrids of metal oxide nanoparticles and silsesquioxane are summarized in Table 1.

TABLE 1

| | Metal oxide nanoparticle | | | Silsesquioxane polymer/Monomer | |
|---|---|---|---|---|---|
| | Type | Average particle size (nm) | Blended amount (mol) | Type | Blended amount (mol) |
| Example 1 | $ZrO_2$ | 50 | 0.10 | C | 0.10 |
| Example 2 | $ZrO_2$ | 50 | 0.10 | A | 0.10 |
| Example 3 | $TiO_2$ | 100 | 0.08 | D | 0.12 |
| Example 4 | $TiO_2$ | 100 | 0.12 | D | 0.08 |
| Example 5 | $TiO_2$ | 100 | 0.14 | D | 0.06 |
| Example 6 | $TiO_2$ | 100 | 0.12 | E | 0.08 |

Evaluation of Physical Properties of Cured Film Formed from Composite

The composite according to the present invention can realize different physical properties depending on the nature of the metal oxide nanoparticles used therein.

When zirconia nanoparticles or titania nanoparticles are used, a cured film having a high refractive index can be attained. In order to verify this effect, for the composites of Examples 1 to 5, the refractive index when each composite was cured at a curing temperature of 250° C. was measured by ellipsometry and evaluated. By changing the amount of the metal nanoparticles, the refractive index was controlled as in Examples 3 to 5. The obtained results are shown in Table 2.

TABLE 2

| Composite/Polymer | Refractive index (633 nm) |
|---|---|
| Example 1 | 1.81 |
| C | 1.52 |
| Example 2 | 1.72 |
| A | 1.38 |
| Example 3 | 1.60 |
| Example 4 | 1.70 |
| Example 5 | 1.80 |
| D | 1.53 |
| Example 6 | 1.71 |

As a result, it was confirmed that the composites according to the present invention had an improved refractive index as compared to the respective original polymers. Furthermore, the transmittance was found to be 95% or higher for all of the composites, and it was thus confirmed that the metal oxide nanoparticles were uniformly dispersed by the reverse micelle dispersion method.

The invention claimed is:

1. A method of producing a composite of metal oxide nanoparticles and silsesquioxane, wherein said method comprises reacting a silsesquioxane polymer having a silanol group at a terminal with metal oxide nanoparticles having a hydroxyl group or an alkoxy group on the surface in a mixed solvent of an aqueous solvent and an organic solvent in the presence of a phase transfer catalyst.

2. The method according to claim 1, wherein said metal oxide nanoparticles are prepared by a sol-gel method using, as a starting material, $M(OR)_4$ (wherein M is an element selected from the group consisting of Ti, Zr, Eu, Zn, B, Al, Ta and Hf and R is hydrogen or a $C_1$ to $C_{10}$ alkyl group or alkenyl group).

3. The method according to claim 1, wherein said metal oxide nanoparticles are represented by the following Formula (2)

$$M_xO_y(OR)_z \quad (2)$$

(wherein

M is an element selected from the group consisting of Ti, Zr, Eu, Zn, B, Al, Ta and Hf, R is hydrogen or a $C_1$ to $C_{10}$ alkyl group or alkenyl group, and 2y+z=x×[valence of M]).

4. The method according to claim 1 wherein said silsesquioxane polymer has a weight-average molecular weight of 500 to 20,000.

5. The method according to claim 1, wherein said metal oxide nanoparticles have an average particle size of 5 to 200 nm.

6. The method according to claim 1, wherein the blending ratio of the silsesquioxane polymer and the metal oxide nanoparticles is 95:5 to 5:95.

7. The method according to claim 1, wherein said silsesquioxane polymer comprises a repeating unit selected from the group consisting of $[R^1SiO_{1.5}]$ (wherein $R^1$ is a group selected from the group consisting of hydrogen, an alkyl group, an aryl group and an alkenyl group) and $[SiO_2]$, $R^1$ in each unit of $[R^1SiO_{1.5}]$ can be different from each other, and the composition ratio of the repeating unit $[R^1SiO_{1.5}]$ and the repeating unit $[SiO_2]$ is 100:0 to 40:60.

8. The method according to claim 1, wherein the phase transfer catalyst is selected from the group consisting of quaternary ammonium compounds, quaternary phosphonium compounds, pyridinium compounds, crown ethers and mixtures thereof, and the amount of the phase transfer catalyst is 20 to 50% by mol, with respect to the number of moles of the metal oxide nanoparticles.

9. The method according to claim 1, wherein the temperature of the reaction is 20 to 80° C.

* * * * *